United States Patent
Perrin et al.

(10) Patent No.: US 8,266,894 B2
(45) Date of Patent: Sep. 18, 2012

(54) THERMAL PROTECTION SYSTEM FOR REDUCING AGENT INJECTOR

(75) Inventors: James M. Perrin, Livonia, MI (US); John A. Catalogna, Livonia, MI (US)

(73) Assignee: GM Global Technology Operations LLC

(*) Notice: Subject to any disclaimer, the term of this patent is extended or adjusted under 35 U.S.C. 154(b) by 628 days.

(21) Appl. No.: 12/423,292

(22) Filed: Apr. 14, 2009

(65) Prior Publication Data

US 2010/0154385 A1 Jun. 24, 2010

Related U.S. Application Data

(60) Provisional application No. 61/140,283, filed on Dec. 23, 2008.

(51) Int. Cl.
*F01N 3/00* (2006.01)
*F01N 3/10* (2006.01)

(52) U.S. Cl. ............... 60/286; 60/285; 60/295; 60/303

(58) Field of Classification Search ............... 60/274, 60/278, 285, 286, 295, 301, 303
See application file for complete search history.

(56) References Cited

U.S. PATENT DOCUMENTS

| | | | | |
|---|---|---|---|---|
| 7,607,503 B1* | 10/2009 | Schechter | ............... | 180/165 |
| 2002/0118016 A1* | 8/2002 | Sollart | ............... | 324/378 |
| 2007/0163232 A1* | 7/2007 | Ueno | ............... | 60/274 |
| 2007/0245714 A1* | 10/2007 | Frazier et al. | ............... | 60/276 |
| 2007/0251218 A1* | 11/2007 | Driscoll et al. | ............... | 60/286 |
| 2009/0288395 A1* | 11/2009 | Haeberer et al. | ............... | 60/286 |

FOREIGN PATENT DOCUMENTS

| | | | |
|---|---|---|---|
| DE | 102006025257 | | 12/2007 |
| DE | 102006053485 | | 5/2008 |
| DE | 102006053485 | A1 * | 5/2008 |
| WO | WO 2007/137918 | A1 | 6/2007 |
| WO | WO 2008009940 | A2 * | 1/2008 |
| WO | WO 2008/058896 | A1 | 5/2008 |

OTHER PUBLICATIONS

German Office Action for Serial No. 102009059859.6 dated Jun. 21, 2011; 5 pages.
U.S. Appl. No. 12/415,109, filed Mar. 31, 2009, Jasinkiewicz, Paul.

* cited by examiner

*Primary Examiner* — Thomas Denion
*Assistant Examiner* — Audrey K Bradley

(57) ABSTRACT

An engine control system includes a temperature determination module, a reducing agent control module, and a control module. The temperature determination module determines a temperature of a reducing agent injector heated by an exhaust gas. The reducing agent control module actuates the reducing agent injector to inject an amount of reducing agent into the exhaust gas when the temperature is greater than or equal to a temperature threshold. The control module controls a concentration of nitrogen oxides in the exhaust gas based on the amount of reducing agent injected into the exhaust gas.

16 Claims, 3 Drawing Sheets

THERMAL PROTECTION SYSTEM FOR REDUCING AGENT INJECTOR

CROSS-REFERENCE TO RELATED APPLICATIONS

This application claims the benefit of U.S. Provisional Application No. 61/140,283, filed on Dec. 23, 2008. The disclosure of the above application is incorporated herein by reference.

FIELD

The present disclosure relates to engine control systems, and more particularly to a thermal protection system for a reducing agent injector.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Diesel engines emit exhaust gas that includes carbon monoxide (CO), hydrocarbons (HC), and nitrogen oxides (NOx). A diesel exhaust treatment system reduces the levels of CO, HC, and NOx in the exhaust gas. The diesel exhaust treatment system may include a diesel oxidation catalyst (DOC), a diesel particulate filter (DPF), and a selective catalytic reduction (SCR) system. The DOC oxidizes CO and HC to form carbon dioxide and water. The DPF removes diesel particulate matter from the exhaust gas. The SCR system reduces NOx.

The SCR system involves injecting a reducing agent (e.g., urea) into the exhaust gas upstream from an SCR catalyst. The reducing agent forms ammonia that reacts with NOx in the SCR catalyst. The reaction of ammonia and NOx in the SCR catalyst reduces the NOx and results in the emission of diatomic nitrogen and water. When excess reducing agent is injected into the exhaust gas, the excess reducing agent may form excess ammonia that passes through the SCR catalyst without reacting. An additional catalyst may be used downstream of the SCR catalyst to remove the excess ammonia.

SUMMARY

An engine control system comprises a temperature determination module, a reducing agent control module, and a control module. The temperature determination module determines a temperature of a reducing agent injector heated by an exhaust gas. The reducing agent control module actuates the reducing agent injector to inject an amount of reducing agent into the exhaust gas when the temperature is greater than or equal to a temperature threshold. The control module controls a concentration of nitrogen oxides in the exhaust gas based on the amount of reducing agent injected into the exhaust gas.

An engine control method comprises determining a temperature of a reducing agent injector heated by an exhaust gas. The method further comprises actuating the reducing agent injector to inject an amount of reducing agent into the exhaust gas when the temperature is greater than or equal to a temperature threshold. Additionally, the method comprises controlling a concentration of nitrogen oxides in the exhaust gas based on the amount of reducing agent injected into the exhaust gas.

BRIEF DESCRIPTION OF THE DRAWINGS

The drawings described herein are for illustration purposes only and are not intended to limit the scope of the present disclosure in any way.

DETAILED DESCRIPTION

Figure 1:
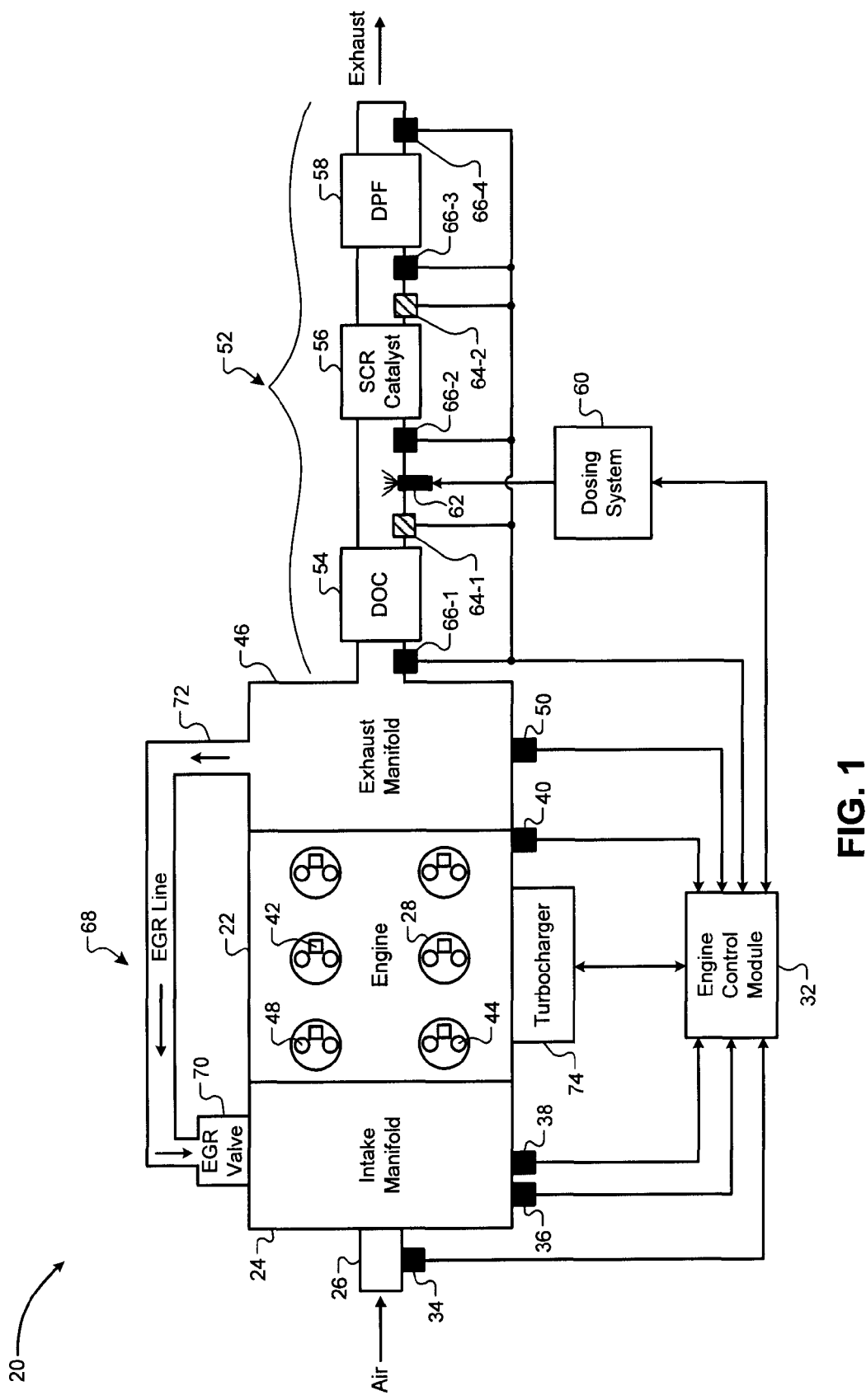
FIG. 1 is a functional block diagram of a diesel engine system according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable hardware components that provide the described functionality.

A selective catalytic reduction (SCR) system includes a reducing agent injector that injects a reducing agent into the exhaust gas. Excess reducing agent injected into the exhaust gas may form excess ammonia that passes through an SCR catalyst without reacting. An injector protection system according to the present disclosure consumes the excess ammonia from the exhaust gas using exhaust gas recirculation (EGR) and combustion techniques. The injector protection system injects excess reducing agent into the exhaust gas to cool the reducing agent injector. The system also modifies EGR and injection timing to increase a concentration of nitrogen oxides (NOx) in the exhaust gas. The increased concentration of NOx in the exhaust gas removes the excess ammonia via a reaction in the SCR catalyst.

Referring now to FIG. 1, a diesel engine system 20 includes an engine 22 that combusts an air/fuel mixture to produce drive torque. Air is drawn into an intake manifold 24 through an inlet 26. A throttle (not shown) may be included to regulate air flow into the intake manifold 24. Air within the intake manifold 24 is distributed into cylinders 28. Although FIG. 1 depicts six cylinders 28, the engine 22 may include additional or fewer cylinders 28.

The engine system 20 includes an engine control module (ECM) 32 that communicates with components of the engine system 20. The components may include the engine 22, sensors, and actuators as discussed herein. The ECM 32 may implement the injector protection system of the present disclosure.

Air is passed from the inlet 26 through a mass airflow (MAF) sensor 34. The MAF sensor 34 generates a MAF signal that indicates a rate of air flowing through the MAF sensor 34. A manifold pressure (MAP) sensor 36 is positioned in the intake manifold 24 between the inlet 26 and the engine 22. The MAP sensor 36 generates a MAP signal that indicates air pressure in the intake manifold 24. An intake air temperature (IAT) sensor 38 located in the intake manifold 24 generates an IAT signal based on intake air temperature.

An engine crankshaft (not shown) rotates at engine speed or a rate that is proportional to engine speed. A crankshaft sensor 40 senses a position of the crankshaft and generates a crankshaft position (CSP) signal. The CSP signal may be related to the rotational speed of the crankshaft and cylinder events. For example only, the crankshaft sensor 40 may be a variable reluctance sensor. The engine speed and cylinder events may be sensed using other suitable methods.

The ECM 32 actuates fuel injectors 42 to inject fuel into the cylinders 28. An intake valve 44 selectively opens and closes to enable air to enter the cylinder 28. An intake camshaft (not shown) regulates intake valve position. A piston (not shown) compresses and combusts the air/fuel mixture within the cylinder 28. The piston drives the crankshaft during a power stroke to produce drive torque. Exhaust gas resulting from the combustion within the cylinder 28 is forced out through an exhaust manifold 46 when an exhaust valve 48 is in an open position. An exhaust camshaft (not shown) regulates exhaust valve position. An exhaust manifold pressure (EMP) sensor 50 generates an EMP signal that indicates exhaust manifold pressure.

An exhaust treatment system 52 may treat the exhaust gas. The exhaust treatment system 52 may include a diesel oxidation catalyst (DOC) 54, an SCR catalyst 56, and a diesel particulate filter (DPF) 58. The DOC 54 oxidizes carbon monoxide and hydrocarbons in the exhaust gas. The SCR catalyst 56 uses a reducing agent to reduce NOx in the exhaust gas. The DPF 58 removes diesel particulate matter in the exhaust gas.

The engine system 20 includes a dosing system 60. The dosing system 60 stores the reducing agent. For example, the reducing agent may include a urea/water solution. The dosing system 60 may control a temperature of the reducing agent. For example, the dosing system 60 may heat the reducing agent to prevent freezing of the reducing agent. The ECM 32 may actuate the dosing system 60 to control the temperature of the reducing agent and/or determine a current temperature of the reducing agent. The dosing system 60 may determine an amount of the reducing agent remaining in the dosing system 60. The dosing system 60 may pressurize the reducing agent for delivery to a reducing agent injector 62. The reducing agent injector 62 is hereinafter called an injector 62. The ECM 32 may actuate the dosing system 60 to control a pressure of the reducing agent for delivery to the injector 62.

The injector 62 measures and controls an amount of the reducing agent injected into the exhaust gas that flows through the exhaust treatment system 52. The reducing agent is mixed with the exhaust gas to carry out the reduction of NOx in the SCR catalyst 56. The ECM 32 may actuate the injector 62 to measure and control the amount of the reducing agent injected into the exhaust gas. The ECM 32 may apply a voltage and/or current to the injector 62 to actuate the injector 62. The voltage and/or current applied to the injector 62 controls the amount of reducing agent injected into the exhaust gas.

The injector 62 may include an actuating element (e.g., a solenoid) having a resistance. The resistance of the actuating element is hereinafter referred to as a resistance of the injector 62. The ECM 32 may determine the resistance of the injector 62 based on the voltage and/or the current applied to the injector 62. For example, the ECM 32 may divide the voltage by the current to determine the resistance of the injector 62. The resistance of the injector 62 may indicate a temperature of the injector 62. For example, the resistance of the injector 62 may increase/decrease with increasing/decreasing temperature. The ECM 32 may determine the temperature of the injector 62 based on the resistance of the injector 62. The ECM 32 may also determine the temperature of the injector 62 based on ambient temperatures, a temperature of the exhaust gas, a flow rate of the exhaust gas, the amount of reducing agent flowing through the injector 62, and vehicle speed.

The exhaust treatment system 52 may include NOx sensors 64-1, 64-2 (collectively NOx sensors 64) and exhaust temperature sensors 66-1, 66-2, 66-3, 66-4 (collectively exhaust temperature sensors 66). Each NOx sensor 64 generates a NOx level signal that indicates an amount of NOx in the exhaust gas. Each exhaust temperature sensor 66 generates an exhaust temperature signal that indicates the temperature of the exhaust gas. The exhaust temperature sensors 66 measure temperatures of the exhaust gas upstream from the DOC 54, the SCR catalyst 56, and the DPF 58. The exhaust temperature sensors 66 may also measure a temperature of the exhaust gas downstream from the DPF 58. The NOx sensors 64 indicate the amount of NOx in the exhaust gas upstream and downstream of the SCR catalyst 56. The ECM 32 may use the NOx level signals to determine a conversion efficiency of the SCR catalyst 64 and to determine the amount of reducing agent to inject into the exhaust gas.

While four temperature sensors 66 and two NOx sensors 64 are shown in FIG. 1, the exhaust treatment system 52 may include more or less than four temperature sensors 66 and more or less than two NOx sensors 64. The injector protection system of the present disclosure may be implemented in the engine system 20 without the exhaust temperature sensors 66 and NOx sensors 64.

The injector 62 is heated by the exhaust gas. The injector 62 may be damaged by the reducing agent when the injector 62 is heated beyond a threshold temperature. The reducing agent may corrode components of the injector 62 when the injector 62 is heated beyond the threshold temperature. For example only, the threshold temperature may include temperatures in the range of 120-130° C. The injector protection system of the present disclosure protects the injector 62 from damage due to corrosion above the threshold temperature.

The engine system 20 may include an EGR system 68. The EGR system 68 includes an EGR valve 70 and an EGR line 72. The EGR system 68 may introduce a portion of exhaust gas from the exhaust manifold 46 into the intake manifold 24. The EGR valve 70 may be mounted on the intake manifold 24. The EGR line 72 may extend from the exhaust manifold 46 to the EGR valve 70, providing communication between the exhaust manifold 46 and the EGR valve 70. The ECM 32 may actuate the EGR valve 70 to increase or decrease an amount of exhaust gas introduced into the intake manifold 24.

The engine 22 may include a turbocharger 74. The turbocharger 74 may be driven by the exhaust gas received through a turbine inlet. For example only, the turbocharger 74 may include a variable nozzle turbine. The turbocharger 74 increases airflow into the intake manifold to cause an increase in intake manifold pressure (i.e., boost pressure). The ECM 32 actuates the turbocharger 74 to selectively restrict the flow of the exhaust gas, thereby controlling the boost pressure.

Figure 2:
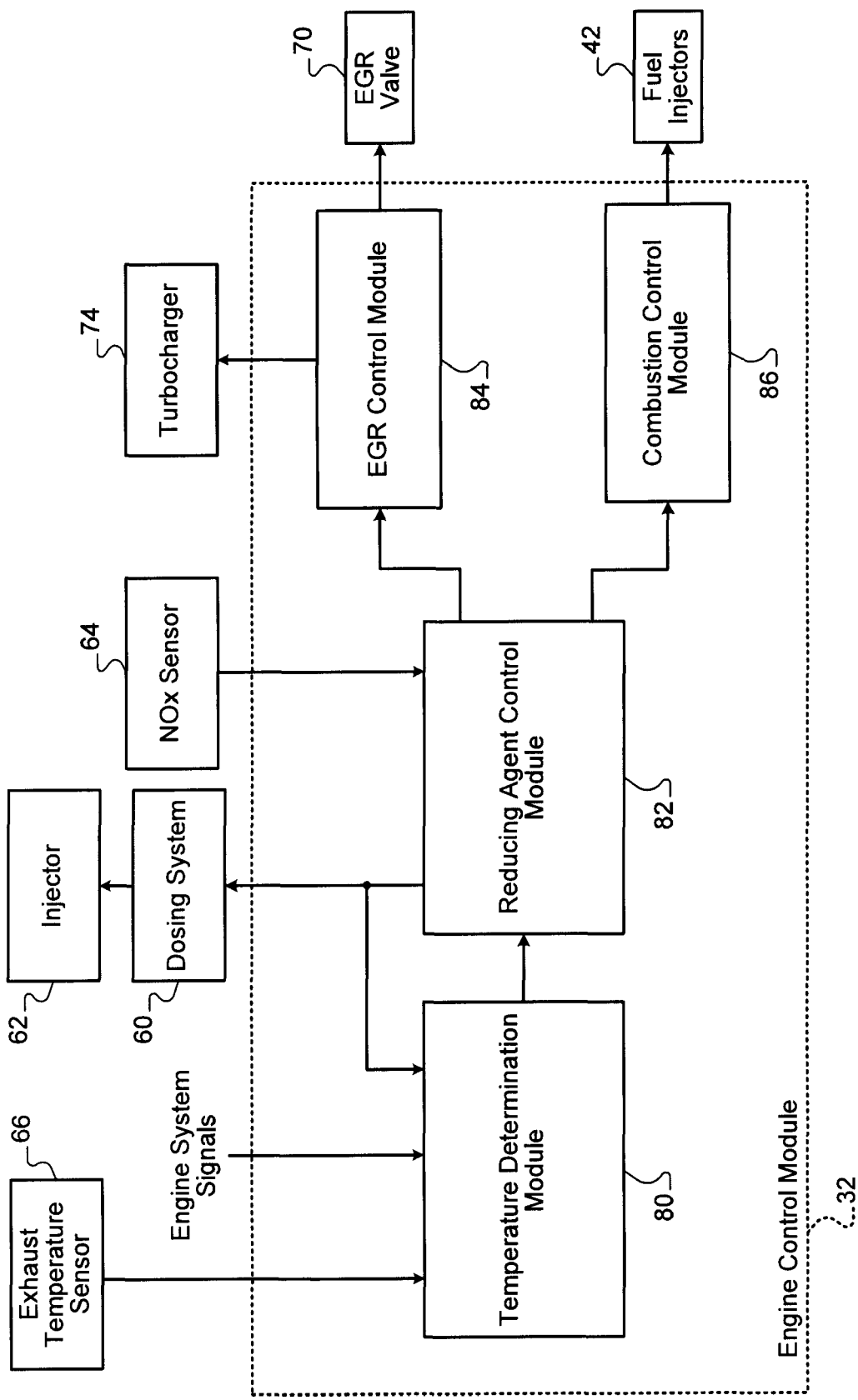
FIG. 2 is a functional block diagram of an engine control module according to the present disclosure.

Referring now to FIG. 2, the ECM 32 includes a temperature determination module 80, a reducing agent control module 82, an EGR control module 84, and a combustion control module 86. The ECM 32 receives input signals from the engine system 20. The input signals include the MAF, MAP, IAT, CSP, EMP, exhaust temperature, and NOx level signals. The input signals are hereinafter referred to as "engine system signals." The ECM 32 processes the engine system signals and generates timed engine control commands that are output to the engine system 20. The engine control commands may actuate the fuel injectors 42, the EGR valve 70, the dosing system 60, the injector 62, and the turbocharger 74.

The temperature determination module 80 determines the temperature of the injector 62 and outputs the temperature of the injector 62 to the reducing agent control module 82. The temperature determination module 80 may determine the temperature of the injector 62 based on exhaust temperature signals when the exhaust treatment system 52 includes the exhaust temperature sensor 66. Alternatively, the temperature determination module 80 may determine the temperature of the injector 62 based on an injector temperature model. The injector temperature model may determine the temperature of the injector 62 based on engine system signals and the amount of reducing agent flowing through the injector 62. The injector temperature model may be based on engine system signals other than exhaust temperature signals when the exhaust treatment system 52 does not include the exhaust temperature sensor 66.

The temperature determination module 80 may determine the temperature of the injector 62 based on the resistance of the injector 62. The temperature determination module 80 may determine the resistance of the injector 62 based on the voltage and/or the current applied to the injector 62 to actuate the injector 62. When the actuating element of the injector 62 includes a metallic element, the resistance of the injector 62 may follow a metallic temperature-resistance relationship. For example, the resistance of the injector 62 may increase/decrease with an increase/decrease in the temperature of the injector 62.

The reducing agent control module 82 receives the temperature of the injector 62 and modulates a flow of the reducing agent through the injector 62 based on the temperature of the injector 62. The reducing agent control module 82 modulates the flow of the reducing agent to decrease the temperature of the injector 62 when the temperature of the injector 62 is greater than or equal to the threshold temperature. The reducing agent control module 82 may actuate the dosing system 60 and the injector 62 to increase the flow of the reducing agent through the injector 62 to decrease the temperature of the injector 62 below the threshold temperature. For example, the reducing agent control module 82 may actuate the dosing system 60 to increase a pressure of the reducing agent for increased delivery of the reducing agent to the injector 62. The reducing agent control module 82 may also actuate the injector 62 to allow more reducing agent to flow through the injector 62 and into the exhaust gas.

The reducing agent may form ammonia before reacting in the SCR catalyst 56. The increase in flow of reducing agent to reduce the temperature of the injector 62 may increase ammonia stored on the SCR catalyst 56. The increase in ammonia may result in unreacted ammonia exhausted from the exhaust treatment system 52. The reducing agent control module 82 may signal the EGR control module 84 and the combustion control module 86 to increase NOx in the exhaust gas to consume or react with excess ammonia.

The reducing agent control module 82 controls NOx in one or more ways. The reducing agent control module 82 outputs an EGR control signal to the EGR control module 84 to control NOx. Additionally, the reducing agent control module 82 outputs a combustion control signal to the combustion control module 86 to control NOx. The reducing agent control module 82 may signal the EGR control module 84 and/or the combustion control module 86 to increase NOx in the exhaust gas based on the amount of reducing agent injected into the exhaust gas. The reducing agent control module 82 may signal an increase in NOx based on feedback received from the NOx sensors 64.

The EGR control module 84 receives the EGR control signal from the reducing agent control module 82. The EGR control module 84 increases NOx in the exhaust gas based on the EGR control signal. The EGR control module 84 may control NOx in numerous ways. In general, a decrease in EGR causes an increase in NOx. The EGR control module 84 may actuate the EGR valve 70 to decrease the amount of EGR. The EGR control module 84 may decrease back pressure to decrease EGR. For example, the EGR control module 84 may actuate the turbocharger 74 to decrease the back pressure. The EGR control module 84 may control timing of the intake/exhaust valves 44, 48 to control EGR by trapping exhaust gas in the cylinder 28.

The combustion control module 86 receives the combustion control signal from the reducing agent control module 82. The combustion control module 86 increases NOx in the exhaust gas based on the combustion control signal. The combustion control module 86 actuates the fuel injectors 42 to control NOx. For example, the combustion control module 86 may advance injection timing to increase NOx.

The ECM 32 may increase NOx in the exhaust gas based on a combination of EGR techniques and combustion techniques, where both techniques increase NOx. For example, the ECM 32 may advance injection timing while decreasing EGR to increase NOx. The ECM 32 may also increase NOx using a combination of EGR techniques that decrease NOx and combustion techniques that increase NOx. For example, the ECM 32 may increase EGR to decrease NOx while advancing injection timing to increase NOx, which may result in a net increase in NOx. The ECM 32 may also increase NOx using a combination of EGR techniques that increase NOx and combustion techniques that decrease NOx. For example, the ECM 32 may decrease EGR to increase NOx while retarding injection timing to decrease NOx, which may result in a net increase in NOx.

Figure 3:
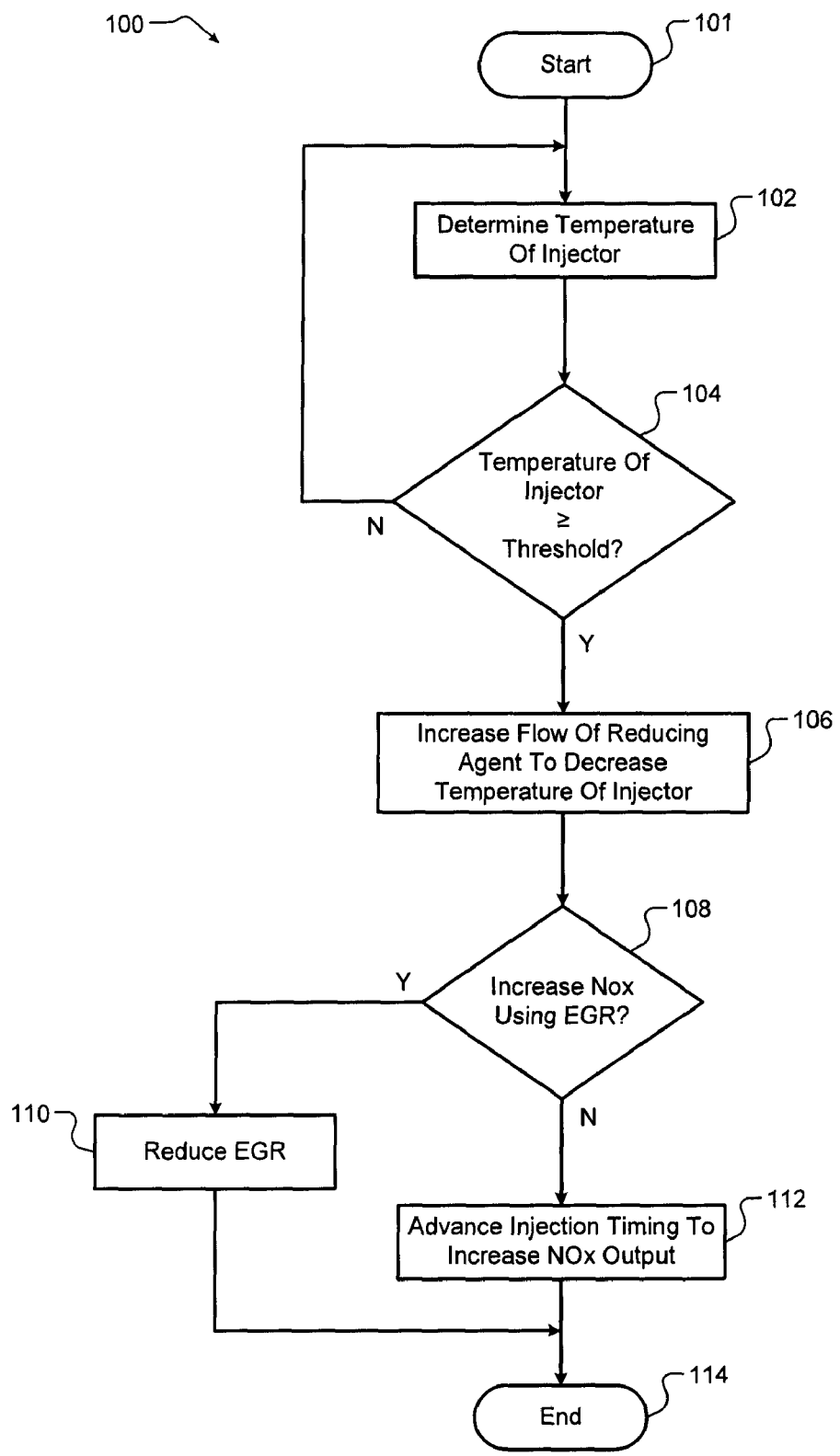
FIG. 3 is a flow diagram that illustrates the steps of a method for protecting a reducing agent injector according to the present disclosure.

Referring now to FIG. 3, a method 100 for protecting a reducing agent injector starts in step 101. In step 102, the temperature determination module 80 determines the temperature of the injector 62. In step 104, the temperature determination module 80 determines whether the temperature of the injector 62 is greater than or equal to the threshold temperature. If false, the method 100 repeats step 102. If true, the method 100 continues with step 106. In step 106, the reducing agent control module 82 increases the flow of reducing agent to decrease the temperature of the injector 62. In step 108, the reducing agent control module 82 determines whether to increase NOx using the EGR techniques. If true, the EGR control module 84 reduces EGR in step 110. If false, the method 100 continues with step 112. In step 112, the combustion control module 86 actuates the fuel injectors 42 using advanced injection timing to increase NOx output. The method 100 ends in step 114.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:
1. An engine control system comprising:
   a temperature determination module that determines a temperature of a reducing agent injector heated by an exhaust gas based on a resistance of the reducing agent injector;

a reducing agent control module that actuates said reducing agent injector to inject an amount of reducing agent into said exhaust gas when said temperature is greater than or equal to a temperature threshold; and a control module that controls a concentration of nitrogen oxides in said exhaust gas based on said amount of reducing agent injected into said exhaust gas, wherein said temperature determination module determines said temperature of said reducing agent injector further based on said amount of reducing agent injected into said exhaust gas.

2. The engine control system of claim 1 wherein said temperature determination module determines said temperature of said reducing agent injector further based on a temperature of said exhaust gas.

3. The engine control system of claim 1 wherein said temperature determination module determines said temperature of said reducing agent injector based on at least one of a voltage and current applied to said reducing agent injector to actuate said reducing agent injector.

4. The engine control system of claim 1 wherein said control module controls said concentration of nitrogen oxides by actuating fuel injectors.

5. The engine control system of claim 1 wherein said control module increases said concentration of nitrogen oxides in said exhaust gas based on said amount of reducing agent injected into said exhaust gas.

6. The engine control system of claim 1 wherein said control module controls said concentration of nitrogen oxides using exhaust gas recirculation (EGR).

7. The engine control system of claim 6 wherein said control module controls said concentration of nitrogen oxides by actuating at least one of an EGR valve and a turbocharger.

8. The engine control system of claim 6 wherein said control module controls said concentration of nitrogen oxides by actuating intake and exhaust valves to trap said exhaust gas in a cylinder.

9. An engine control method comprising:
determining a temperature of a reducing agent injector heated by an exhaust gas based on a resistance of said reducing agent injector;

actuating said reducing agent injector to inject an amount of reducing agent into said exhaust gas when said temperature is greater than or equal to a temperature threshold;

determining said temperature of said reducing agent injector further based on said amount of reducing agent injected into said exhaust gas; and controlling a concentration of nitrogen oxides in said exhaust gas based on said amount of reducing agent injected into said exhaust gas.

10. The engine control method of claim 9 further comprising determining said temperature of said reducing agent injector further based on a temperature of said exhaust gas.

11. The engine control method of claim 9 further comprising determining said temperature of said reducing agent injector based on a voltage and current applied to said reducing agent injector to actuate said reducing agent injector.

12. The engine control method of claim 9 further comprising controlling said concentration of nitrogen oxides by actuating fuel injectors.

13. The engine control method of claim 9 wherein said controlling a concentration of nitrogen oxides in said exhaust gas comprises increasing said concentration of nitrogen oxides in said exhaust gas based on said amount of reducing agent injected into said exhaust gas.

14. The engine control method of claim 8 further comprising controlling said concentration of nitrogen oxides using exhaust gas recirculation (EGR).

15. The engine control method of claim 14 further comprising controlling said concentration of nitrogen oxides by actuating at least one of an EGR valve and a turbocharger.

16. The engine control method of claim 14 further comprising controlling said concentration of nitrogen oxides by actuating intake and exhaust valves to trap said exhaust gas in a cylinder.

* * * * *